United States Patent [19]

O'Brien, III et al.

[11] Patent Number: 5,204,797
[45] Date of Patent: Apr. 20, 1993

[54] SOLID STATE OVERCURRENT PROTECTION SYSTEM FOR CIRCUIT BREAKERS

[75] Inventors: Edward R. O'Brien, III, Wayne; Edward Rifkin, Plymouth Mtg., both of Pa.

[73] Assignee: SPD Technologies, Inc., Philadelphia, Pa.

[21] Appl. No.: 691,319

[22] Filed: Apr. 25, 1991

Related U.S. Application Data

[63] Continuation-in-part of Ser. No. 514,150, Apr. 25, 1990, abandoned, which is a continuation of Ser. No. 336,471, Apr. 12, 1989, Pat. No. 4,922,372.

[51] Int. Cl.$^5$ ............................................. H02H 3/08
[52] U.S. Cl. ........................................ 361/93; 361/97
[58] Field of Search ..................................... 361/94–97

[56] References Cited

U.S. PATENT DOCUMENTS

4,922,372  5/1990  O'Brien, III ........................ 361/97

*Primary Examiner*—Todd E. DeBoer
*Attorney, Agent, or Firm*—Charles N. Quinn

[57] ABSTRACT

A device for detecting a primary fault current at a three phase current system and converting the detected fault current into mechanical action for breaking the circuit includes circuitry for breaking the circuit in response to a selected secondary current substantially instantaneously rising to a predetermined level and a device for adjusting the predetermined level.

13 Claims, 4 Drawing Sheets

SOLID STATE OVERCURRENT PROTECTION SYSTEM FOR CIRCUIT BREAKERS

This invention is a continuation-in-part of U.S. patent application Ser. No. 07/514,150, filed Apr. 25, 1990, abandoned, which is in turn a continuation of U.S. patent application Ser. No. 07/336,471 filed Apr. 12, 1989, now U.S. Pat. No. 4,922,372.

FIELD OF THE INVENTION

This invention relates to circuit breakers in general and particularly to overcurrent protection circuitry integrally mounted within the circuit breakers.

DESCRIPTION OF THE PRIOR ART

Known thermo-mechanical or thermo-magnetic overcurrent protection systems for circuit breakers operate by deflection of bimetallic strips. Typically, the bimetallic strip deflects in response to rising temperature caused by fault currents flowing through the strip.

Known thermo-mechanical or thermo-magnetic overcurrent protection devices for circuit breakers are expensive to manufacture and require laborious calibration. These thermo-mechanical devices for circuit breakers are inherently subject to aging and metal fatigue; their trip-time delay tends to decrease for a given fault current as ambient temperature rises.

Another problem with conventional thermo-mechanical overcurrent protection devices for circuit breakers is phase-to-phase interactions. Trip time for a three-phase fault current typically decreases from trip-time for a single phase fault current.

In conventional electronic overcurrent protection for circuit breakers, each of three phases of current is converted to a voltage by a burden resistor. The three voltages are then provided to a common point via diodes. The highest resulting voltage appears at the common point beyond the diodes. This back biases those diodes which are not connected to the highest current phase.

SUMMARY OF THE INVENTION

As used herein, the terms "fast-time trip" and "instantaneous trip", when associated with a current or a voltage, denote a current above which the circuit breaker of the invention has no reason to wait to trip (and thereby open a circuit of interest). The invention provides circuitry having instantaneous trip settable at several different levels, which may be selected by switches associated with the invention.

In one of its aspects, this invention provides a device for detecting a primary fault current in a three-phase current system and converting the detected fault current into mechanical action for breaking the circuit carrying the primary fault current. The device includes means for (i) receiving three phases of primary current, (ii) providing corresponding phases of secondary current, preferably within a desired amperage metering range, (iii) choosing the largest magnitude secondary current and (iv) providing the largest magnitude secondary current as output.

The device further includes means for providing a voltage proportional to the largest magnitude secondary current, means for storing the peak voltage proportional to the largest magnitude secondary current and means, connected between output of the proportional voltage providing means and the peak voltage storing means, for moving a trip member thereby providing mechanical action to break a circuit in response to current therein exceeding a predetermined level.

The device still further includes means for directing the largest magnitude secondary current through the trip member moving means and means for actuating this directing means upon the first voltage substantially instantaneously rising to a predetermined first level. The device yet further includes means for actuating the directing means upon the first voltage reaching a second level and remaining at the second level for a preselected time interval.

The means for choosing the largest magnitude secondary current among the corresponding phases of secondary current and providing the chosen largest magnitude secondary current as output is preferably a passive diode bridge network.

The means for providing voltage proportional to the largest magnitude secondary current is preferably a resistor.

The means for storing a peak value of voltage proportional to the largest magnitude secondary current is preferably a capacitor.

The means for actuating the largest magnitude secondary output current directing means, upon the first voltage reaching a preselected level and remaining at the preselected level for a preselected time interval, is preferably a passive RC network.

The means for moving a trip member and thereby providing the mechanical action, in response to current exceeding a predetermined level, is preferably a coil positioned between output of the proportional voltage providing means and the peak value storing means but switched to ground to activate trip.

The means for providing voltage proportional to the largest magnitude secondary current further preferably includes a resistor receiving the largest magnitude secondary output current from the diode bridge network; this resistor allows current to flow to ground via first switching means operating responsively to a latch portion of the device. The latch disconnects the resistor from ground upon the latch being actuated.

The latch directs the largest magnitude secondary output current through the trip member moving means and operates responsively to predetermined functions of (i) magnitude and (ii) time derivative of a voltage proportional to the largest magnitude secondary current. The latch continuously directs the largest magnitude secondary output current through the trip member moving means after predetermined criteria, which may be functions of magnitude and time derivative of a voltage proportional to the largest magnitude secondary current, have been satisfied.

In another of its aspects this invention provides a device for detecting a primary fault current in a three phase current system and converting the detected fault current into mechanical action for breaking a circuit in which the primary fault current occurred, where the device includes means for receiving the phases of primary current and for providing corresponding phases of secondary current within a predetermined desired metering range and choosing the largest magnitude secondary current to be provided as output therefrom.

The device further provides means for providing voltage proportional to the largest magnitude secondary current and yet further provides means, connected to the output of the proportional voltage providing means, for moving a trip member providing the mechanical action. The device yet further includes means for directing the largest magnitude secondary current through the trip member moving means. Yet further provided as a part of the device are means for actuating the current directing means upon the voltage proportional to the largest magnitude secondary current substantially instantaneously rising to a first predetermined level. Means are also provided for adjusting the first predetermined level. Yet further provided are means for actuating the current directing means upon the voltage proportional to the largest magnitude secondary current reaching a second level and remaining at the second level for a predetermined time interval. Still yet further provided are means for adjusting the predetermined time interval.

The invention accommodates a wide range of currents to be metered. This invention provides circuit breaking functions even at very low magnitude secondary currents output from the diode bridge network. Also, the circuit dissipates very little power; a very large percentage of the largest magnitude secondary output current is used to energize the solenoid coil, providing the requisite mechanical action for circuit opening. The low power dissipation of the characteristic of the circuitry of the invention allows the invention to be used in severe operating environments. Moreover, because so little power is dissipated, the circuitry can be housed in a very compact package.

The invention preserves linearity over substantially the entire metering range of the circuit breaker.

DESCRIPTION OF THE PREFERRED EMBODIMENTS AND BEST MODE KNOWN FOR PRACTICING THE INVENTION

Figure 2:
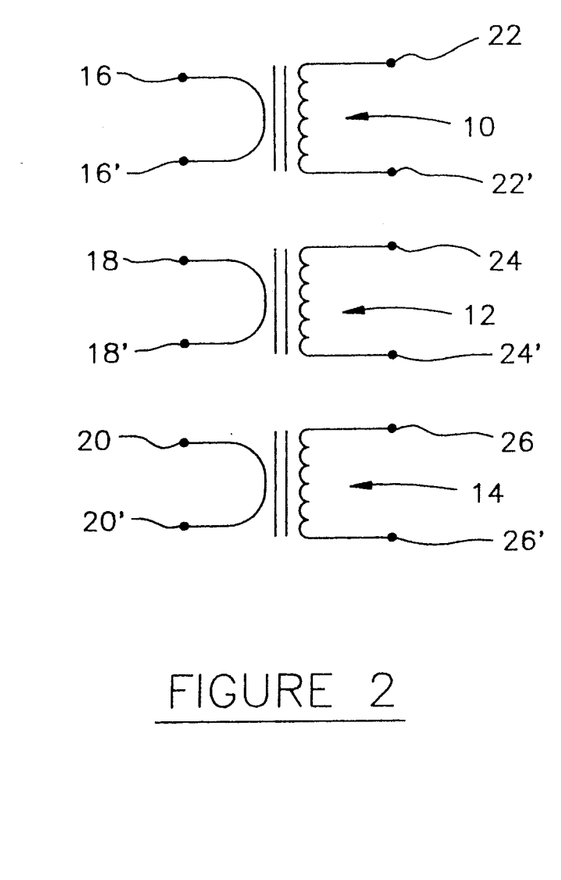
FIG. 2 is a schematic representation of transformers.

Referring to the drawings generally and to FIG. 2 in particular, 10, 12, 14 schematically represent three transformers having input terminals 16, 16', 18, 18' and 20, 20' respectively and output terminals 22, 22', 24, 24' and 26, 26' respectively. Transformers 10, 12, 14 receive respective phases of a three-phase input current where the first phase may be considered as being at terminals 16, 16', the second phase as being at terminals 18, 18' and the third phase as being at terminals 20, 20'. The input primary current is from a circuit in which fault current, in a three-phase current system, is to be detected.

Figure 1:
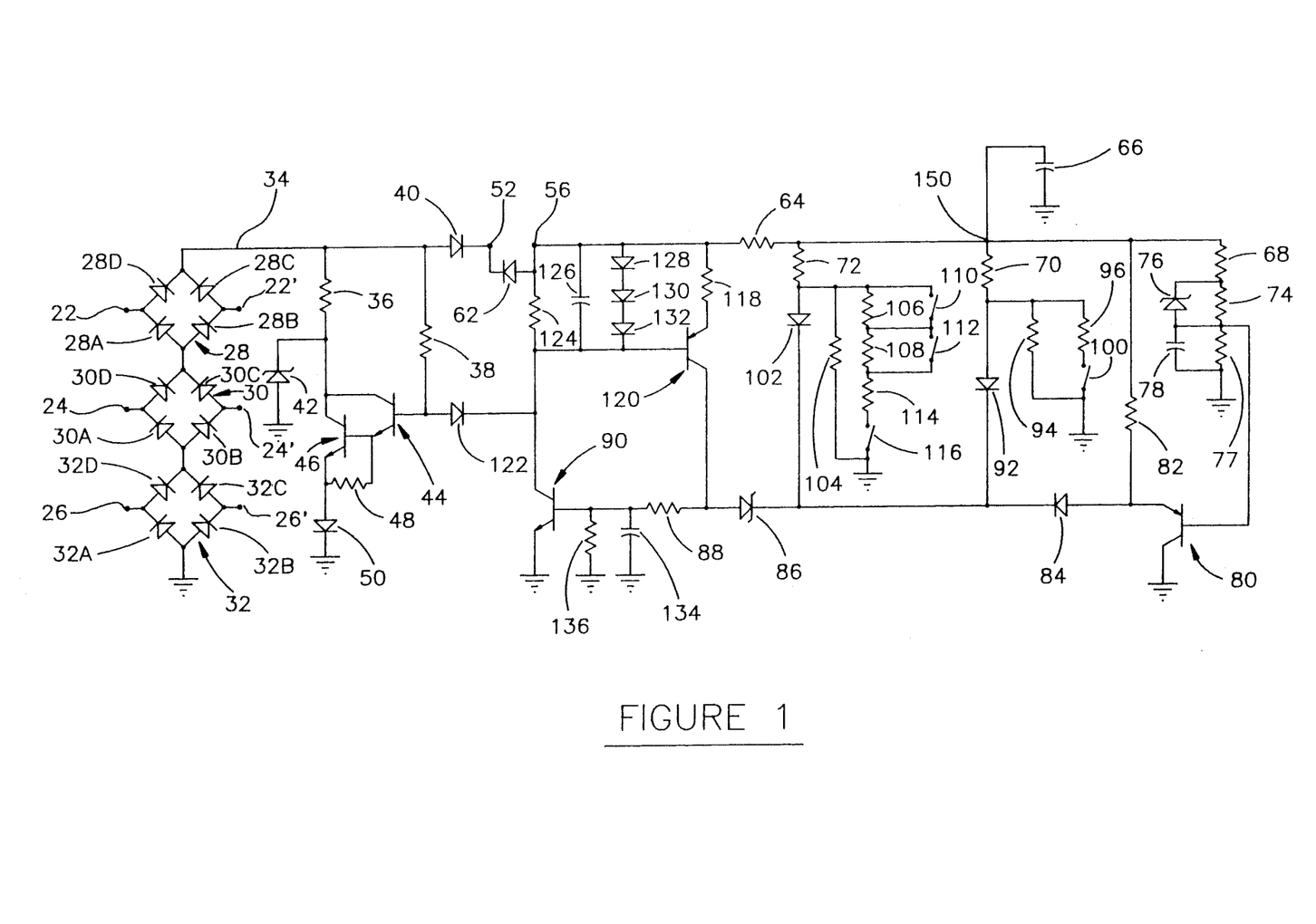
FIG. 1 is a schematic representation of circuitry manifesting aspects of the invention.

Referring to FIG. 1, terminals 22, 22', 24, 24' and 26, 26' of transformers 10, 12, 14 are connected to diode bridges denoted generally 28, 30 and 32 respectively. Diode bridge 28 includes diodes 28A and 28B having anodes connected together and having respective cathodes connected to terminals 22, 22'. Diode bridge 28 further includes diodes 28C, 28D having cathodes connected together and having anodes respectively connected to terminals 22, 22' and to respective cathodes of diodes 28A, 28B.

Diode bridge 30, similarly to diode bridge 28, includes diodes 30A, 30B having anodes connected together and having respective cathodes connected to terminals 24, 24'. Diode bridge 30 further includes diodes 30C, 30D having anodes respectively connected to terminals 24, 24' and to cathodes of diodes 30A and 30B, with diodes 30C and 30D having their cathodes connected together and to connected anodes of diodes 28A and 28B.

Diode bridge 32, similarly to diode bridges 28, 30, includes diodes 32A, 32B having their anodes connected together and to ground and having their respective cathodes connected to terminals 26, 26'. Diode bridge 32 further includes diodes 32C, 32D having anodes respectively connected to cathodes of diodes 32A, 32B and to terminals 26, 26' and having cathodes connected together and to connected anodes of diodes 30A, 30B.

Output of diode bridges 28, 30, 32 is provided via connected cathodes of diodes 28C, 28D via a line 34, to which a burden resistor 36 and another resistor 38 are connected, with line 34 connecting to an anode of a diode 40.

A zener 42 connects resistor 36 with ground. The terminal of resistor 36 to which zener 42 connects also connects to collectors of transistors 44, 46, configured as a Darlington pair. The emitter of transistor 44 connects to the base of transistor 46 and also to the emitter of transistor 46 via a resistor 48. The emitter of transistor 46 connects to ground via a diode 50.

Figure 3:
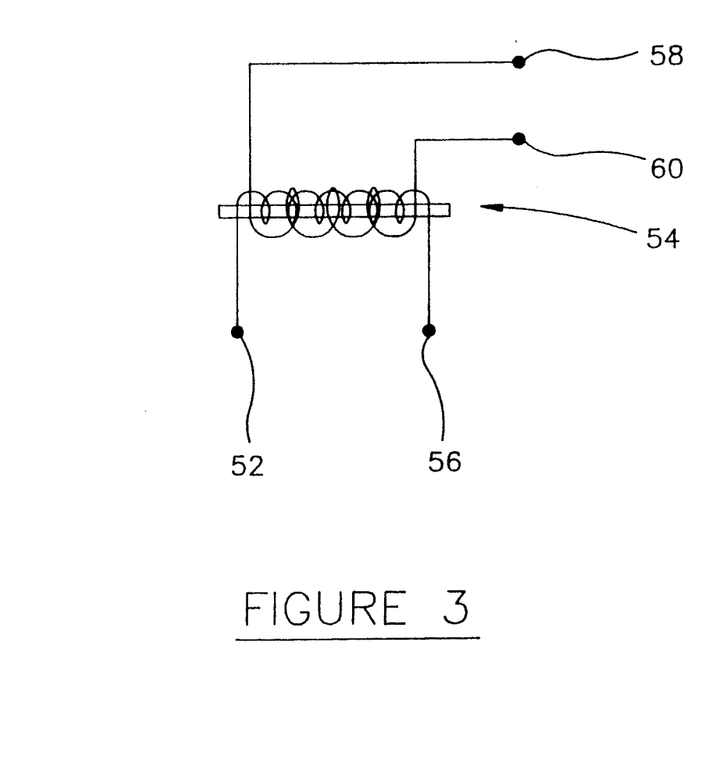
FIG. 3 is a schematic representation of a coil.

The cathode of diode 40 is connected to an input terminal 52 of a solenoid designated generally 54, illustrated schematically in FIG. 3. Solenoid 54 includes an output terminal 56 with the primary winding of solenoid 54 being between terminals 52, 56. If desired, solenoid 54 may further include a secondary winding, having terminals 58, 60, connected to an auxiliary switch or other means for external actuation of the circuit breaker.

A diode 62 is across terminals 52, 56 of solenoid 54, as illustrated in FIG. 1, with diode 62 having its cathode connected to terminal 52 and its anode connected to terminal 56.

Further connected to terminal 56 is a current limiting resistor 64 through which current may reach a capacitor 66 connected between resistor 64 and ground. Further connected to resistor 64 and capacitor 66 are resistors 68, 70 and 72. The remaining terminal of resistor 68 is connected to resistor 74. A zener 76 has its cathode connected to the common junction of resistors 68, 74 and its anode connected to the other side of resistor 74, where resistor 77 is also connected. The remaining terminal of resistor 77 is connected to ground. A capacitor 78 is also connected to the anode of zener 76, in parallel with resistor 77. The terminal defining connection of capacitor 78, the anode of zener 76 and the respective connected terminals of resistors 74, 77 is in turn connected to the base of a transistor 80, which is preferably a PNP-type. Transistor 80 has its collector connected to ground and its emitter connected via a resistor 82 to the junction of capacitor 66 and resistors 64, 68, 70 and 72.

The emitter of transistor 80 further connects to the anode of a diode 84 which in turn connects to the cathode of a zener 86 whose anode is connected via resistor 88 to the base of a transistor 90.

Resistor 70 is likewise connected via a diode 92 to a junction defined by the cathode of diode 84 and the cathode of zener 86. Resistors 94, 96 connect to resistor 70 at the terminal thereof which connects to the anode of diode 92. The remaining terminal of resistor 94 is connected to ground. The remaining terminal of resistor 96 may be connected to ground via a manual switch 100.

Similarly to resistor 70, resistor 72 is connected to a junction defined by connected cathodes of diode 84 and zener 86, via a diode 102. This terminal of resistor 72 is also connected to ground via resistor 104. Resistors 106 and 108, having switches 110, 112 respectively in parallel therewith, are in series connection with resistor 114 which in turn may be connected to ground via a switch 116. Switches 110, 112 and 116, similarly to switch 100, are preferably manually actuated.

A resistor 118 connects terminal 56 to the emitter of a transistor 120 which is preferably a PNP-type. The collector of transistor 120 is connected via resistor 88 to the base of transistor 90. The collector of transistor 90, which is preferably a NPN-type, is connected to the base of transistor 120. The base of transistor 44, connected via resistor 38 to line 34, is in turn also connected via diode 122 to the collector of transistor 90 and to the base of transistor 120.

The base of transistor 120 is also connected to terminal 56 via resistor 124. A capacitor 126 is in parallel with resistor 124. Further in parallel with resistor 124 and capacitor 126 are three series connected diodes 128, 130 and 132. The emitter of transistor 90 is connected to ground. The base of transistor 90 is also connected to ground via capacitor 134 and resistor 136 in parallel with one another.

During operation of the invention, if a single transformer, for example transformer 14 in FIG. 2, is active in the sense of a current passing through primary windings having terminals 20, 20', the secondary current induced between terminals 26, 26' forces its way through not only diodes 32C and 32D of diode bridge 32 but also through diode bridges 30 and 28. If a higher secondary current is flowing between two other terminals, such as terminals 22, 22' in one of the other diode bridges, such as diode bridge 28, the lower of the two currents flows as a current imbalance through the diode bridges. Current flowing in the diode bridges splits to flow through the two parallel paths in each diode bridge and recombines to exit a respective diode bridge. As a result, the highest current flowing in any of the three diode bridges 22', 24', 26' appears at line 34 as the output from the diode bridges. Remaining lower magnitude currents circulate internally within their respective diode bridges but do not add to the single highest current appearing at line 34. In other words, only the single highest current of the three phases appears at line 34; no summation of internal currents occurs.

As an example, if a secondary winding current of two amps is flowing between terminals 22, 22', from terminal 22 to terminal 22', and a secondary winding current of one amp is flowing between terminals 24 24' from terminal 24 to terminal 24' the two amp current at terminal 24 flows through diode 30D but is blocked from flowing to terminal 24' by diode 30C. This current, which is at the connected cathodes of diodes 28A, 28B, splits between diodes 28A and 28B. The resulting split current flows as one amp through diode 28A and one amp through diode 28B. (This split current is in addition to the one amp of current already flowing between terminals 22 and 22', from terminal 22 to terminal 22'.) The split currents flowing through diodes 28A and 28B combine with the already extant current endeavoring to flow from terminal 22 to terminal 22' so that the combined current through diodes 28C, 28D appearing at line 34 is of the same two amp magnitude as the current applied at terminals 24, 24'.

The resulting current in line 34 establishes a voltage across resistor 36, which is normally grounded through the collector and emitter of transistor 46 and through diode 50. Transistor 46 is normally "on" as a result of bias applied to the base of transistor 46 by the emitter of transistor 44, which bias is in turn a result of a current signal being applied to the base of transistor 44 via resistor 38; the current signal results from voltage at line 34 appearing across resistor 38.

Voltage at line 34 passing through diode 40 and through solenoid 54, connected between terminals 52, 56 as illustrated in FIG. 3, appears at terminal 56. Impedance presented by solenoid 54 is low; no significant voltage drop occurs between diode 40 and terminal 56.

A latch circuit is defined by transistors 90, 120 and associated passive elements and tends to be stable in either its conducting or non-conducting state. In the non-conducting state, essentially no current flows through either transistor 90 or transistor 120, or through any of their associated connected paths and components. As a result, circuit breaking decisions are made by components to the right of resistor 64 in FIG. 1. Resistor 64 is a small resistor, protecting capacitor 66 by limiting current thereto and functioning as a spike suppressor so decision circuitry to the right of resistor 64 in FIG. 1 does not respond to noise.

Signals below about 1,000 cycles pass through resistor 64 relatively unimpeded and are stored as voltage on capacitor 66. This assures that the circuit breaking trip decision is made on a direct current signal, not on an alternating current signal. Because voltage appearing at line 34 and passing through resistor 64 is normally the peak portion of a wave form, capacitor 66 filters that peak wave to a DC voltage.

The circuitry illustrated in FIG. 1 provides a number of different circuit breaking actions. One of these is a long-time trip.

The long-time trip sequence begins with voltage accumulating on capacitor 78. Resistor 77 competes with capacitor 78 for charging current and thereby establishes the desired time band to define long-time trip. Zener 76 in parallel with resistor 74 creates an artificial knee in the time band charging curve so that capacitor 78 charges quickly if voltage at terminal 150 is high, but charges slowly if voltage at terminal 150 is low. Zener 76 causes an artificially accelerated charging rate when voltage at terminal 150 is above a selected point. This causes trip time to change rapidly when input current, provided via one of the pairs of diode bridge terminals, is above a selected value.

Voltage from capacitor 78 is applied to the base of transistor 80, which acts as an emitter follower, so that charging currents used to charge capacitor 78 do not limit current available for actuating the latch defined by transistors 90, 120 and associated components.

For some applications, slow or long-time trip and associated time constants are desirable. To achieve long time constants, charging currents must be small. If the latch transistors 90, 120 consume a large portion of the charging current, then irregularities within the latch could adversely affect charging rate. Transistor 80 isolates the firing circuitry defined by latch transistors 90, 120 from charging capacitor 78. This results in the charge accumulated on capacitor 78 being controlled by resistors 68, 74, 77, not by the firing circuitry connected to the emitter of transistor 80. Hence, voltage on capacitor 78 is a function of time and the values of resistors 68, 74 and 77 but is not a function of circuitry connected to the emitter of transistor 80. (If transistor 80 were not present, voltage on capacitor 78 would also be affected by the firing circuitry, including the latch which is generally connected to the emitter of transistor 80 in FIG. 1. This would be undesirable.)

Resistor 82 reduces voltage from terminal 150 applied to the emitter of transistor 80 so that emitter voltage of transistor 80 tracks voltage appearing on capacitor 78. As a result, voltage at the emitter of transistor 80 is about one diode drop above voltage across capacitor 78 and tracks the voltage appearing across capacitor 78.

Voltage at the emitter of transistor 80 is lowered by diode 84 which provides one diode drop of voltage from the emitter of transistor 80 to the cathode of zener 86.

When voltage at the cathode of zener 86 (which is one diode drop below emitter voltage of transistor 80) rises sufficiently to break zener 86, resulting bias applied via resistor 88 to the base of transistor 90 turns transistor 90 "on", permitting current to flow into the collector of transistor 90 and out of the emitter of transistor 90. Resulting collector current of transistor 90 creates bias at the base of transistor 120, turning transistor 120 "on" thereby placing the latch defined by transistors 90, 120 in its "on" or conducting state.

When transistor 120 turns on, voltage at terminal 56 drops close to ground potential as a result of the path provided to ground via resistor 124 through transistor 90. This causes current from one of diode bridges 28, 30, 32 to flow via line 34 and pass through coil 54, actuating the coil and providing the requisite mechanical action for opening the circuit of interest.

When transistor 90 is on and hence is saturated, base current (which would otherwise be provided to transistors 44, 46) is shunted away through diode 122, whose cathode is connected to the collector of transistor 90. As a result, the Darlington pair of transistors 44, 46 turns "off" and current which had been passing through resistor 36 is forced through coil 54, from terminal 52 to terminal 56. As a result, resistor 36 does not compete with coil 54 for available firing current.

The sequence of operation of the circuit described above, whereby the circuit fires in response to voltage on capacitor 78 reaching a predetermined value, is the long-time trip or firing sequence of the invention.

Short-time trip results from voltage across diode 102 connected to the cathode of zener 86. When voltage on the anode of diode 102 (appearing across resistor 72 from terminal 150) reaches the level that the emitter voltage of transistor 80 must reach for long-time trip, the circuit fires by zener 86 breaking and the latch defined by transistors 90, 120 turning "on" as described above.

Voltage on diode 102 is a division of voltage at terminal 56 (which presumably has been slowly charging capacitor 78, in preparation for long-time trip.) A voltage divider is defined by resistor 72 and a combination of resistors 106, 108, 104 and 114, where the combination is selected by positioning switches 110, 112 and 116. By selecting settings for switches 110, 112 and 116 and selecting values for resistors 104, 106, 108 and 114, voltage at the top of diode 102 can be controlled, as can the rate at which that voltage reaches a level to fire the circuit by breaking zener 86.

Diode 92, resistors 70, 94 and 96 and switch 100 function analogously to diode 102, resistor 72 and the resistor-switch combination circuitry immediately to the right of diode 102 in FIG. 1, to provide additional options for defining short-time trip characteristics.

In the preferable short-time trip firing mode of the circuit, the circuit fires effectively instantaneously. Whenever voltage at terminal 56 is sufficient to cause the circuit to fire ( where "fire" denotes actuation of latch transistors 90, 120, with those two transistors shifting to their "on" or "conducting" state) the latch actuates, permitting current flow through coil 54 and providing the requisite mechanical action to open the circuit of interest.

When switch 100 is open, short-time trip or firing is controlled by division of voltage between resistors 70 and 94. When switch 100 is closed, if resistor 96 is small the circuit associated with switch 100 is rendered effectively inoperative and firing is controlled by circuitry with which switches 110, 112, 116 are associated. Use of switches 100, 110, 112, 116 permits five different short-time, effectively instantaneous trip points (in the sense that five different voltage levels, having five different rise characteristics, may be defined for circuit breaker actuation).

In the latch defined by transistors 90, 120, it is desirable that the transistor carrying the bulk of the latch current not carry such current through the transistor base. (If latch transistors 90, 120 were connected in a "back-to-back" configuration, the bases of the so-connected transistors would be forced to carry most of the current circulating around the latch, which would be undesirable.) Resistor 124 prevents transistor 120 from having excessively high base current. Unfortunately, resistor 124 also tends to block current from reaching terminal 56 of coil 54.

In the latch, transistor 90 is the main current carrying transistor. Current through transistor 90, from the collector out through the emitter of transistor 90, must produce some voltage drop in order to bias transistor 120 "on" and thereby turn the latch "on." If resistor 124 were not present and an open circuit was provided in lieu of resistor 124, the circuit might appear to work properly in that when transistor 90 turned "on", transistor 90 would appear to draw current through transistor 120 and hence through coil 54. This would effectively create a short circuit through transistor 120, from its emitter to its collector if resistor 118 were not present. Such a short circuit is prevented by resistor 118 between terminal 56 and the emitter of transistor 120; resistor 118 limits the emitter-base current in transistor 120. Were resistor 124 replaced by an open circuit, resistor 118 would limit current through coil 54. However, use of resistor 118 to protect transistor 120 could effectively block current from flowing through coil 54, thereby disabling the circuitry from performing its ultimate intended function.

To combat this problem, diodes 128, 130, 132 provide an alternate path so that most of the current passing through coil 54 travels through diodes 128, 130, 132 successively and then through the collector of transistor 90. Diodes 128, 130, 132, having current from coil 54 passing therethrough, provide a voltage drop sufficient to bias the base of transistor 120 so that transistor 120 turns "on."

While a resistor could be used in place of diodes 128, 130, 132, this would not be as desirable as the configuration illustrated because diodes 128, 130, 132 provide a significant voltage drop even for very small amounts of current. This voltage drop contributes to stability of the latch defined by transistors 90, 120 and their associated passive current elements. Diodes 128, 130, 132 do not provide any significant resistance to current flowing through coil 54 once the bias at the base of transistor 120, provided by diodes 128, 130, 132, has been established.

Capacitor 126 insures that the latch defined by transistors 90, 120 stays "on" even during zero crossings of a single phase signal. Capacitor 126 stores charge when the latch defined by transistors 90, 120 turns "on"; charge stored on capacitor 126 tends to keep the latch "on" by continuously biasing the base of transistor 120, even if there is no current through coil 54, once the latch turns on in response to an appropriate over-current condition.

Capacitor 126 also acts as a spike suppressor; hence capacitor 126 cannot be excessively large. While capacitor 126 tends to keep the latch "on" when the latch is already on, capacitor 126 likewise tends to keep the latch "off" when the latch is already off. For example, if transistor 90 operates only momentarily, the initial collector current in transistor 90 comes through capacitor 126 and does not provide sufficient voltage at the base of transistor 120 to turn transistor 120 on; this can occur if transistor 90 is held on for from about one-quarter to about one-half a millisecond.

Another advantage provided by resistor 124 is the dissipation of leakage current from transistor 120 through resistor 124. Leakage current in transistor 120 could cause the latch defined by transistors 90, 120 to self-actuate if resistor 124 were not present (to provide an escape path for any leakage current).

Many diodes, such as diodes 128, 130, 132, are somewhat photosensitive; resistor 124 helps to short those diodes when no substantial current is flowing therethrough, thereby eliminating any photosensitive effects which might otherwise act to trigger the latch.

Zener 76 introduces a knee into the circuit characteristic long-time trip curve. The time to charge capacitor 78, which controls long-time trip, is a function of the time constant of the RC combination defined by resistor 68 plus resistors 74 and 77 in parallel with capacitor 78; this time constant defines the exponential characteristic by which capacitor 78 charges to reach the selected voltage at which long-time trip occurs.

If zener 76 is not present and values of resistors 68, 74 are selected so that capacitor 78 reaches the trip voltage in a selected time for a selected current level, as current goes higher and higher, time to charge capacitor 78 does not decrease sufficiently to provide adequate protection for the circuit experiencing the over-current condition, due to the fixed values of resistors 68, 74. Specifically, if resistors 68, 74 are made small enough that high currents cause sufficiently rapid charging of capacitor 78, the circuit takes too little time to trip at lower currents.

This potential problem is cured by providing zener 76 to effectively reduce the resistance provided by the combination of resistors 68, 74, by shorting out resistor 74 above a selected voltage. Because zener 76 does not instantaneously short and collapse, zener 76 permits relatively smooth phasing between the condition at which resistor 74 is effectively in the circuit and the condition at which resistor 74 is effectively bypassed.

Resistor 136 affects voltage required on the cathode of zener 86 for firing the latch. Resistor 136 effectively shunts small currents away from zener 86. This is desirable because zeners depart from their theoretical ideal a voltages at the zener decreases. Hence, when relatively small voltages are across zener 86, some current flows through zener 86 even though the voltage across zener 86 is much less than normal circuit firing voltage. This undesirable leakage current is shunted away from the base of transistor 90 by resistor 136. To the extent current is shunted from the base of transistor 90, the voltage across zener 86 to cause firing is affected; hence the value of resistor 136 affects latch firing voltage.

An additional advantage provided by the circuit is that the voltage at line 34 prior to circuit firing is essentially divided between resistor 36 and coil 54 because resistor 38 has large impedance relative to resistor 36 and coil 54. Resistor 36 is essentially removed from the circuit when the circuit fires and the Darlington pair defined by transistors 44, 46 opens the connection between resistor 36 and ground. When this occurs, most of the current that had been passing through resistor 36 passe through coil 54.

Switches 100, 110, 112, 114 have been provided as a single six-position DIP switch available from Grayhill. Transistors 46 and 90 have been 10 amp, 70 volt NPN type transistors available from Motorola, transistors 80, 120 have been 0.6 amp, 60 volt PNP type transistors available from Motorola and transistor 44 has bee a 1.0 amp, 80 volt NPN type transistor also available from Motorola.

Zener 42 has been a 62 volt transient suppressor zener available from either Unitrode or Microsemi, zener 86 has been a 5.1 volt, 400 milliwatt zener available from either Motorola or Microsemi while zener 76 has been a 9.1 volt, 400 milliwatt zener available from either Motorola or Microsemi. The diodes in diode bridges 28, 30, 32 and diodes 40, 50, 62, 120, 130 and 132 have all been one amp, 200 volt rectifying diodes available from either Unitrode or General Instrument. Diodes 122, 102, 92 and 84 have been 200 milliamp, 100 volt rectifying diodes available from either Unitrode or Fairchild.

Figure 4:
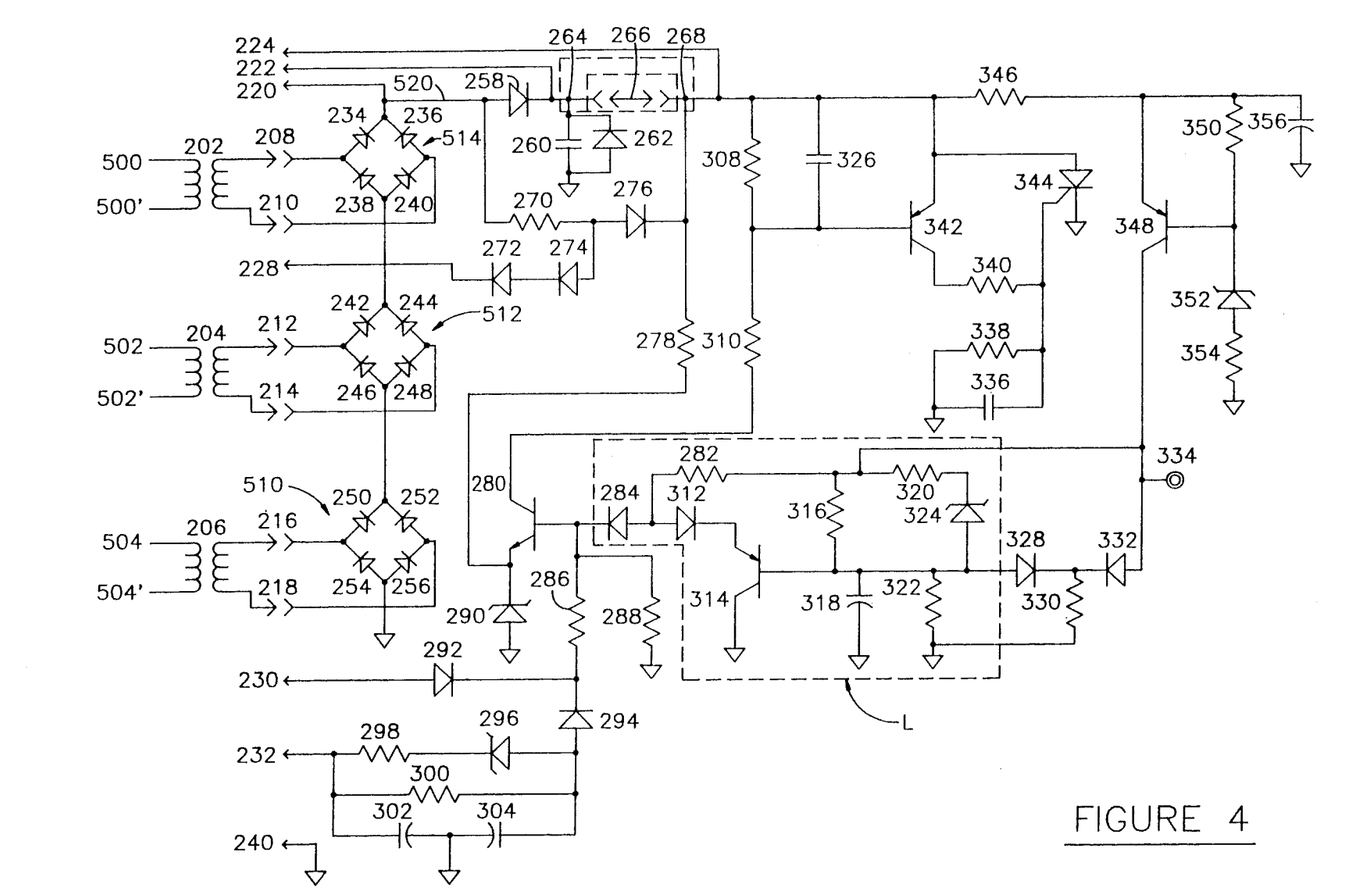
FIG. 4 is a schematic representation of the circuitry of the mother board of an embodiment of the invention.
Figure 5:
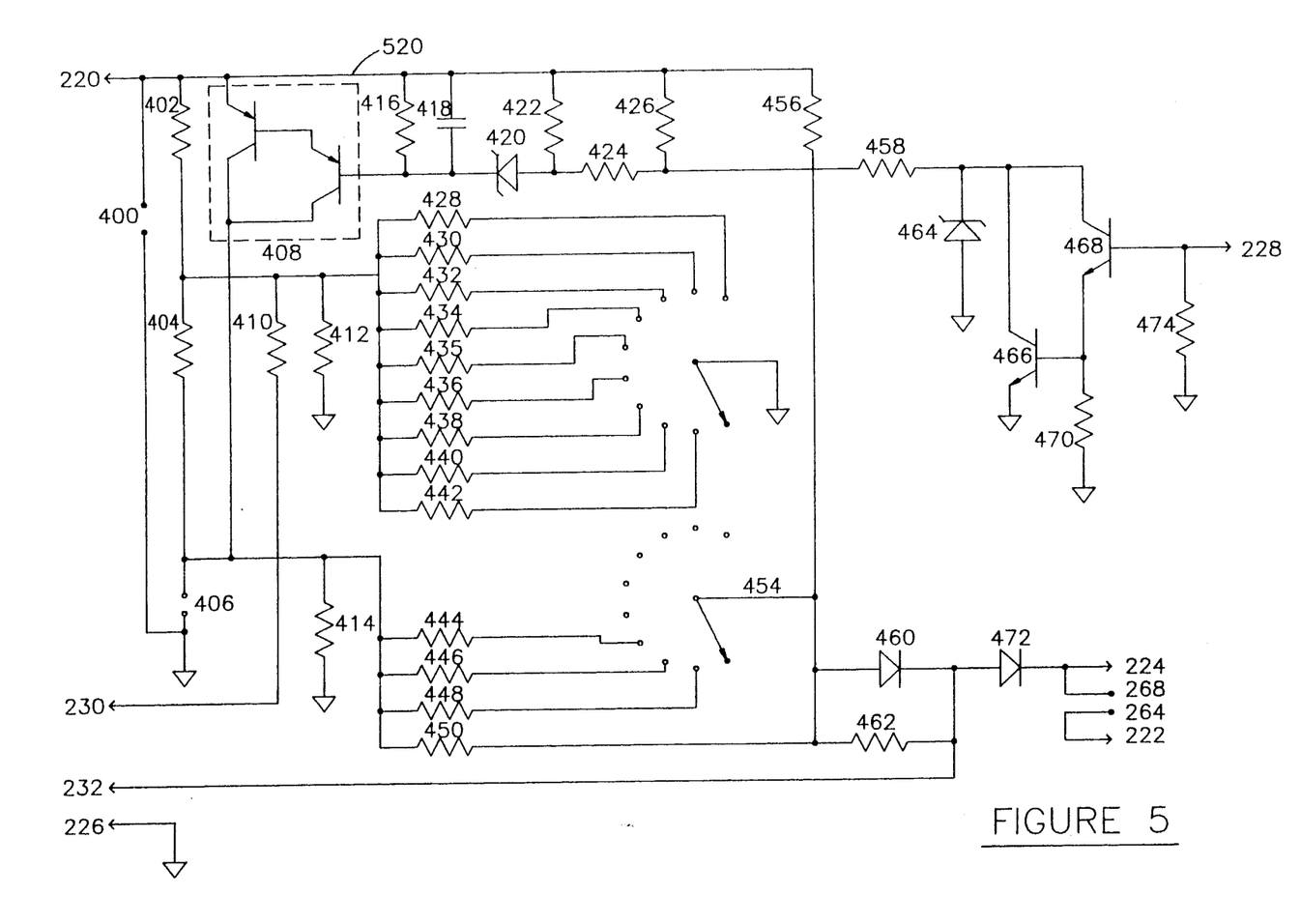
FIG. 5 is a schematic representation of the circuitry of a daughter board connected with the mother board of FIG. 4.

A second embodiment of the invention, which is the preferred embodiment and illustrates the best mode for practicing the invention is illustrated FIGS. 4 and 5.

The second, preferred embodiment employs a two board design. The mother board circuitry is illustrated in FIG. 4 while the daughter board circuitry is illustrated in FIG. 5. The two boards are connected by pins 220, 222, 224, 226, 228, 230 and 232.

Transformers 202, 204 and 206, and connecting lines 208, 210, 212, 214, 216, and 218 may be identical to corresponding elements in the previously described embodiment. The three diode bridge circuits comprising diodes 234, 236, 238, 240, 242, 244, 246, 248, 250, 252, 254 and 256 may be the same as the corresponding elements in FIG. 1. The diode bridges function in the same manner; these bridge circuits provide a secondary output current corresponding to the highest primary phase current detected at transformers 202, 204, and 206.

Referring to FIGS. 4 and 5, the output from the diode bridges is connected through resistor 270, diode 274 and diode 272 via pin 228 to the base of transistor 468 (FIG. 5). Pin 228 and the base of transistor 468 are also connected to ground through resistor 474. The emitter of transistor 468 is connected to the base of transistor 466. The base of transistor 466 and the emitter of transistor 468 are connected to ground through resistor 470. The emitter of transistor 466 is directly grounded. The collectors of transistor 466 and 468 are commonly connected to each other and to ground through zener 464. Additionally, the collectors of transistors 466 and 468 are connected to resistor 458.

The output from the diode bridge circuits is connected through pin 220, resistor 426 and resistor 428 to the collectors of transistors 466 and 468. The output from the diode bridge circuitry is further connected through diode 258, solenoid winding 266 and resistor 346 to capacitor 356 which is in turn connected to ground. The cathode of diode 258 is further connected to the cathode of diode 262 which is also connected to capacitor 260. Capacitor 356 is connected to the base of transistor 348 through resistor 350. Capacitor 356 is also connected to ground through resistor 350, zener 352 and resistor 354 in series.

The emitter of transistor 348 is connected to capacitor 356 while the collector of transistor 348 is connected to the anode of diode 332. Additionally, the collector of transistor 348 is connected through resistor 316 to capacitor 318 which is in turn connected to ground. The anode of diode 332 is connected to ground through resistor 330. The collector of transistor 348 is further connected through resistor 320 to the cathode of zener 324.

The anode of zener 324 is connected to ground through resistor 332. The anode of zener 324 is connected to the anode of diode 328. The cathode of diode 328 is connected to ground through resistor 330 as well as directly to the cathode of diode 332. Resistor 316, the anode of zener 324, the anode of diode 328, resistor 322 and capacitor 318 are all commonly connected to the base of transistor 314. The collector of transistor 314 is connected to ground.

The collector of transistor 348 is further connected to the emitter of transistor 314 through resistor 282 and diode 312. The collector of transistor 348 is further connected through resistor 282 and diode 284 to the base of transistor 280. The base of transistor 280 and the cathode of diode 284 are connected to ground through resistor 288.

The output from the diode bridge circuitry is connected through resistor 270, diode 276 and resistor 278, in series, to the emitter of transistor 280. The emitter of transistor 280 is further connected to the cathode of zener 290 whose anode is connected to ground. The collector of transistor 280 is connected to solenoid winding 266 through resistors 308 and 310. Additionally, the collector of transistor 280 is connected through resistor 310 to the base of transistor 342.

The collector of transistor 342 is connected through resistor 340 and the parallel combination of resistor 338 and capacitor 336 to ground. Additionally, the collector of transistor 342 is connected through resistor 340 to the gate of p-type gate 344. The anode of p-type 344 is connected to the cathode of diode 276 and solenoid winding 266. The cathode of p-type gate 344 is connected to ground.

The output from the diode circuitry is further connected through pin 220 to resistors 422 and 424 which are together in parallel with resistor 426. Resistor 422 is further connected to the anode of zener 420. The cathode of zener 420 is in turn connected to pin 220 through the parallel combination of resistor 416 and capacitor 418. Pin 220 is further connected through resistor 416 to the base of Darlington pair 408. Pin 220 is also connected to the emitter of Darlington pair 408. The collector of Darlington pair 408 is connected to ground through resistor 414.

Pin 220 is further connected to ground through resistors 402 and 412 in series. Resistor 404 is connected to the junction of resistors 412 and 402. The junction of resistors 402 and 412 is further connected to one of resistors 428 - 442 through switch 452 which is connected to ground.

Pin 220 is further connected through resistor 456, a selectable resistor operated by switch 454 which selects among resistors 444, 446 and 448, and through resistor 414 to ground. The junction of resistor 456 and switch 454 is connected to the anode of diode 460 and resistor 462 in parallel. The junction of the cathode of diode 460 and resistor 462 is connected through pin 232 to capacitor 302 which is connected to ground. Pin 232 is also connected through resistor 300 and capacitor 304 to ground. Still further pin 232 is connected through resistor 298 to the cathode of zener 296. The anode of zener 296 is in turn connected to the anode of diode 294. The cathode of diode 294 is connected to the base of transistor 280 through resistor 286. The output from the diode bridge circuitry is further connected through pin 220, resistor 402, and resistor 410 via pin 230 to diode 292. The cathode of diode 460 is connected to diode 472 which is in turn connected through pin 224 to solenoid winding 266. Lastly, capacitor 326 is connected in parallel with resistor 308 with respect to the base of transistor 342.

Referring to FIG. 4, application of power to any or all of transformers 202, 204 and 206 causes current to flow as follows:

1. Through resistor 270, diode 274, diode 272 and thereby turn on transistor 468 and transistor 466 (shown in FIG. 5).
2. From pin 220 in FIG. 4 to pin 220 in FIG. 5 through a low current burden resistor comprised of resistor 426, resistor 458, and transistor 466. (This combination defining the burden resistor is connected for all conditions of over-current.)
3. Through diode 258, solenoid winding 266, resistor 346 and thereby to charge capacitor 356. Capacitor 260 also charges. Current flows through transistor 348 when the voltage on capacitor 356 exceeds the voltage across zener 352 and resistor 354.

This current operates the long time circuitry consisting of transistor 314, diode 284, diode 312, resistor 282, resistor 320, resistor 316, resistor 322, capacitor 318, zener diode 324, denoted by dash line "L" in FIG. 4.

Voltage at point 334 charges capacitor 318 through resistor 316, and also causes a voltage drop to develop across resistor 330 by forward biasing diode 332. Voltage across resistor 330 reverse biases diode 328 preventing capacitor 318 from discharging.

Depending on the voltage at 334, voltage across capacitor 318 may increase, causing current flow through resistor 282, diode 312 and transistor 314 to charge in response.

As voltage at the junction of diode 284 and diode 312 rises, it forward biases diode 284 to develop a voltage drop across resistor 288. This voltage turns on transistor 280 when base voltage exceeds emitter voltage by the base-to-emitter voltage drop.

Current through resistor 278 and zener 290 creates voltage zener 290 and determines emitter voltage of transistor 280.

When transistor 280 turns on and draws current through resistor 308 and resistor 310, voltage drop across resistor 308 forward biases transistor 342 into conduction.

Current through transistor 342, resistor 340, and resistor 338 develops voltage at the junction of resistor 340 and resistor 338 to P-type gate 344, causing P-type gate 344 to conduct.

When P-type gate 344 conducts, the voltage at point 268 which is a connector to a solenoid 266, will be one diode voltage drop above ground. Current through solenoid 266 as well as through diode 276 flows through P-type gate 344. With diode 276 conducting, current diverts from the previous path (through diode 272 and diode 274), causing transistor 466 and transistor 468 to turn "off".

The burden resistor defined by the combination of resistor 426 and resistor 458 no longer passes current because transistor 468 is "off". Consequently, current supplied by one or more of the transformer(s) 202, 204, 206 passes through solenoid 266, which has terminals 264 and 268 and through P-type gate 344 to ground, energizing solenoid 266 to open a circuit breaker.

During operation, if a single transformer, for example transformer 206 in FIG. 4, is active in the sense of a current passing through primary windings having terminals 504, 504', the secondary current induced between terminals 216, 218 forces its way through not only diodes 250 and 252 of diode bridge 510 but also through diode bridges 512 and 514. If a higher secondary current is flowing between two other terminals such as terminals 500 500' in one of the other diode bridges, such as diode bridge 514, the lower of the two currents flows as a current imbalance through the diode bridges. Current flowing in the diode bridges splits to flow through the two parallel paths in each diode bridge and recombine to exit a respective diode bridge. As a result, the highest current flowing in any of the three diode bridges 510, 512, 514 appears at line 520 as the output from the diode bridges. Remaining lower magnitude currents circulate internally within their respective diode bridges but do not add to the single highest current appearing at diode bridge output line 520. In other words, only the single highest current of the three phases appears at line 520; no summation of internal currents occurs.

As an example, if a secondary winding current of two amps is flowing between terminals 208, 210, from terminal 208 to terminal 210, and a secondary winding current of one amp is flowing between terminals 212, 214, from terminal 212 to terminal 214, the two amp current at terminal 212 flows through diode 242 but is blocked from flowing to terminal 214 by diode 244. This current, which is at the connected cathodes of diodes 246, 248, splits between diodes 246 and 248. The resulting split current flows as one amp through diode 246 and one amp through diode 240. (This split current is in addition to the one amp of current already flowing between terminals 208 and 210, from terminal 208 to terminal 210.) The split currents flowing through diodes 238 and 240 combine with the already extant current endeavoring to flow from terminal 208 to terminal 210 so that the combined current through diodes 238, 240 appearing at diode bridge output line 520 is of the same two amp magnitude as the current applied at terminals 212, 214.

The resulting current in diode output line 520 establishes a voltage across resistors 426 and 458, which are normally grounded through the collector and emitter of transistor 466 and through diode 50.

When the voltage at point 334 increases due to increase in primary current through one or more of current transformers 202, 204, 206 to a level at which zener 324 conducts, capacitor 318 charges more quickly from the parallel combination of resistor 316 and resistor 320 in series with zener 324. The result is a shorter time before P-type gate 344 conducts. If voltage at point 334 drops to zero as a result of P-type gate 344 conducting, diode 332 turns "off" thereby eliminating voltage across resistor 330. Diode 328 then conducts and discharges capacitor 318 through resistor 330. If the voltage is not returned to point 334, diode 328 allows capacitor 318 to discharge completely.

With higher primary currents through current transformers 202, 204, 206, the resulting current in diode bridge output line 520 connected to pin 220, as its flow through burden resistors 426 and 458, causes an increase in the voltage of the line connected to pin 220. Resistor 422 and resistor 424, connected in parallel with resistor 426, are affected by the same voltage change.

When voltage difference between junction of resistor 422 and resistor 424 and diode bridge output line 520 exceeds the breakdown voltage of zener 420, zener 420 conducts and current flows from diode bridge output line 520 through resistor 416, zener 420, resistor 424, resistor 458 and transistor 466 to ground.

Voltage drop across resistor 416 turns on Darlington pair 408, causing current flow through Darlington pair 408 and resistor 414, which is a second burden resistor. Effectively, resistor 414 is now in parallel with resistor 426, resistor 458; the combination results in a lower burden resistance value.

A lower burden resistance value is required to prevent saturation of transformers 202, 204, 206 at higher primary currents. Current from diode bridge output line 520 connected to pin 220 flows through resistor 402 and resistor 404 to ground through, resistor 412 and resistor 414. This produces a voltage at the junction of resistor 402 and resistor 404 and, as a result, a voltage at the junction of resistor 286 and resistor 288 at transistor 280 on the mother board as illustrated in FIG. 4. This voltage at the base of transistor 280 causes transistor 280 to conduct in the same manner as the long time circuit, hence solenoid 266 is actuated and, consequently, the circuit breaker will be operated.

Switch 452 connects different ones of resistors 428, 430, 432, 434, 435, 436, 438, 440, 442 between the junction of resistor 402 and resistor 404 and ground thereby setting the level of the voltage which will cause transistor 280 on the mother board as illustrated in FIG. 4 to conduct. For a given resistor selection, voltage on the diode bridge output line 520 to pin 220 must be high enough to cause voltage at the junction of resistor 402 and resistor 404 to turn on transistor 280.

These voltage levels are associated with high primary current levels. Hence, switch 452 selects the instantaneous current levels causes circuit breaker to open. For example, if switch 452 selects a low value resistor, the current transformers 202, 204, 206 must cause a higher current level to flow through resistor 402 and resistor 428 (the resistor selected) to develop sufficient voltage to operate transistor 280.

At high transformer currents, very high transients or spikes are generated when transistor 466 is turned off to remove burden resistors resistor 426 and resistor 458 upon the energizing of solenoid 266. The transients appear at the transformer secondaries and across transistor 466. Zener 464 limits this high voltage peak by conducting when the transient exceeds the rating of zener 464, causing it to conduct and pass the excess current until the transient voltage is diminished or removed. The rating of zener 464 is less than voltage rating of transistor 466, thus protecting transistor 466 from excess voltage.

A current path from the diode bridge line 520 through resistor 456, a selectable resistor 454 and secondary burden resistor 414 to ground, functions as a voltage divider.

At moderate to high transformer primary currents, the corresponding secondary current causes voltage to appear at the junction of resistor 456 and selectable resistor 454. This voltage is passed by diode 460 via pin 232 to the junction of resistor 298, resistor 300 and capacitor 302.

A short time is required for capacitor 302 to charge to the applied voltage. Additionally, this charging voltage is passed by resistor 300 to capacitor 304 where charging also occurs. This results in a brief delay between voltage appearance at capacitor 302 and voltage appearance at capacitor 304. This voltage is passed by diode 294 and resistor 286 to the base of transistor 280, turning transistor 280 "on" in the same manner as the long time circuitry.

At higher currents, voltage at capacitor 302 is correspondingly higher. Consequently, an additional current path functions in parallel with resistor 300. This path is through resistor 298 and zener 296. The zener 296 conducts at higher voltages, causing resistor 298 to be in parallel with resistor 300 for lower effective resistance. Consequently, at higher voltages (which are a result of higher secondary currents) the delay between the voltage variation across capacitor 302 and that across capacitor 304 becomes progressively less The foregoing constitutes the short time delay circuit.

Switch 454 connects different ones of resistors 444, 446, 448 and 450 between resistor 456 and resistor 414. For a lower resistance, a higher secondary current (corresponding to a higher primary current) must flow through the voltage divider to produce a trip voltage at the junction of resistor 456 and the selectable resistor. Consequently, short time delay can be selectable.

At very high primary currents, from 11.25× to 40×, the transformers become saturated and secondary voltage becomes more pulse shaped rather than sinusoidal.

The amplitude is greatly increased while duration is drastically reduced. This wave form is supplied to solenoid 266 at point 264 by the diode bridges through diode 258.

The characteristics of solenoid 266 are that it requires current for a longer period of time in order to operate adequately.

Capacitor 260 stores the charge of a brief, high amplitude pulse and releases current over a longer period of time through solenoid 266, thus supplying adequate current over a longer period of time to actuate the circuit breaker.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

We claim:

1. In a three phase current system, a device for detecting a primary fault current and converting said detected fault current into mechanical action for breaking the circuit in which said primary fault current occurred, comprising:
   a. means receiving said three phases of primary current, for providing corresponding phases of secondary current and choosing the largest magnitude secondary current as output therefrom;
   b. means for providing voltage proportional to said largest magnitude secondary current;
   c. means, connected to an object of said proportional voltage providing means, for moving a trip member providing said mechanical action;
   d. means for directing said largest magnitude secondary current through said trip member moving means;
   e. means for actuating said current directing means upon said voltage proportional to said largest magnitude secondary voltage substantially instantaneously rising to a predetermined first level;
   f. means for adjusting said predetermined first level;
   g. means for actuating said current directing means upon said voltage proportional to said largest magnitude secondary current reaching a second level and remaining at said second level for a predetermined time interval; and
   h. means for adjusting said predetermined time interval.

2. The device of claim 1 wherein said means for choosing the largest magnitude secondary current and providing said largest magnitude secondary current as output is a diode network.

3. The device of claim 1 wherein said means for providing voltage proportional to largest magnitude secondary current comprises at least one resistor.

4. The device of claim 1 further comprising:
   i. additional means for actuating said current directing means upon said voltage proportional to said largest secondary current reaching a third level and remaining at said third level for a time greater than the predetermined time interval of 5. The device of claim 1 wherein said means for moving a trip member comprises a solenoid.

6. The device of claim 1 further comprising:
   i. a means for storing charge provided by said voltage proportional to said largest magnitude secondary current when said voltage is pulse-shaped, and for gradually releasing the charge as a current to energize said solenoid.

7. The device of claim 6 wherein storing means comprises a capacitor.

8. The device of claim 1 further comprising;
   k. means for limiting the magnitude of any transient voltage generated by said current directing means.

9. The device of claim 8 wherein said voltage limiting means comprises a zener.

10. The device of claim 1 wherein said means for adjusting said first voltage level comprises switching means for connecting different resistors to ground.

11. The device of claim 1 wherein said means for adjusting said predetermined time interval comprises switching means for connecting different resistors into a closed circuit.

12. In a three phase current system, a device for detecting a primary fault current and converting said detected fault current into mechanical action for breaking the circuit in which said primary fault current occurred, comprising:
   a. means receiving said three phases of primary current, for providing corresponding phases of secondary current and choosing the largest magnitude secondary current as output therefrom;
   b. means of providing voltage proportional to said largest magnitude secondary current;
   c. means, connected to an output of said proportional voltage providing means, for moving a trip member providing said mechanical action;
   d. means for directing said largest magnitude secondary current through said trip member moving means;
   e. means for actuating said current directing means upon said voltage proportional to said largest magnitude secondary voltage substantially instantaneously rising to a predetermined first level;
   f. means for adjusting said predetermined first level;
   g. means for actuating said current directing means upon said voltage proportional to sd largest magnitude secondary current reaching a second level and remaining at said second level for a predetermined time interval;
   h. means for adjusting said predetermined time interval including switching means for connecting passive impedance providing means into a closed circuit.

13. The circuit of claim 12 wherein said switching means for connecting passive impedance providing means into said closed circuit is manually actuated.

* * * * *